(12) United States Patent
Shao et al.

(10) Patent No.: US 11,953,790 B2
(45) Date of Patent: Apr. 9, 2024

(54) SPACER, METHOD FOR MANUFACTURING SAME, AND DISPLAY DEVICE

(71) Applicant: TCL China Star Optoelectronics Technology Co., Ltd., Guangdong (CN)

(72) Inventors: Yuan Shao, Guangdong (CN); Hsiaohsien Chen, Guangdong (CN); Chunqiu Yan, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 776 days.

(21) Appl. No.: 17/051,281

(22) PCT Filed: May 7, 2020

(86) PCT No.: PCT/CN2020/088912
§ 371 (c)(1),
(2) Date: Oct. 28, 2020

(87) PCT Pub. No.: WO2021/179426
PCT Pub. Date: Sep. 16, 2021

(65) Prior Publication Data
US 2023/0144729 A1    May 11, 2023

(30) Foreign Application Priority Data

Mar. 13, 2020   (CN) .......................... 202010176119.X

(51) Int. Cl.
| | | |
|---|---|---|
| G02F 1/1339 | (2006.01) | |
| C08F 4/80 | (2006.01) | |
| C08F 20/06 | (2006.01) | |
| C08F 20/14 | (2006.01) | |

(52) U.S. Cl.
CPC ............ G02F 1/13398 (2021.01); C08F 4/80 (2013.01); C08F 20/06 (2013.01); C08F 20/14 (2013.01); G02F 1/13394 (2013.01)

(58) Field of Classification Search
CPC ........ G02F 1/13398; C08F 4/80; C08F 20/06; C08F 20/14
USPC ........................................................ 428/1.5
See application file for complete search history.

(56) References Cited

U.S. PATENT DOCUMENTS

2005/0200796 A1    9/2005  Iwanaga et al.

FOREIGN PATENT DOCUMENTS

| CN | 105527761 | 4/2016 |
| CN | 106940496 | 7/2017 |
| CN | 108779251 | 11/2018 |

*Primary Examiner* — Ruiyun Zhang

(57) ABSTRACT

A spacer, a method for manufacturing the spacer, and a display device are provided. The method includes: a step S10 of reacting a resin compound and a pyridine compound to generate an intermediate, a step S20 of reacting the intermediate and a metal ligand by a coordination reaction to obtain a coordination structure, and a step S30 of mixing the coordination structure, a monomer, a solvent, a starting agent, and an additive to prepare the spacer.

14 Claims, 2 Drawing Sheets

SPACER, METHOD FOR MANUFACTURING SAME, AND DISPLAY DEVICE

RELATED APPLICATIONS

This application is a National Phase of PCT Patent Application No. PCT/CN2020/088912 having International filing date of May 7, 2020, which claims the benefit of priority of Chinese Patent Application No. 202010176119.X filed on Mar. 13, 2020. The contents of the above applications are all incorporated by reference as if fully set forth herein in their entirety.

FIELD AND BACKGROUND OF THE INVENTION

The present application relates to the field of display technology, and particularly to a spacer, a method for manufacturing the spacer, and a display device.

Due to their high quality, low weight, low power consumption, low radiation, etc., liquid crystal displays (LCDs) are widely used in various fields. Liquid crystal display panel is the main component in the liquid crystal displays, and the liquid crystal display panel typically includes an array substrate, a color film substrate disposed opposite to the array substrate, and a liquid crystal layer filled between the array substrate and the color film substrate. In order to ensure a thickness and uniformity of the liquid crystal layer, a plurality of spacers (photo spacers) are disposed between the two substrates to form a space to inject liquid crystals.

At present, high temperature Mura (uneven display), low temperature bubble (bubble), high altitude low pressure, and surface pressure test are technical problems commonly faced by LCDs, while the spacers play an important role in the four problems affecting quality of liquid crystal display devices. A better Mura performance requires the spacers to have good elasticity, but a high low pressure requires the spacers to have less elasticity to allow them to be pressed down when shrinking, while a better surface pressure requires the spacers to resist pressure and not be pressed down when shrinking. Hence, the four performances are combined into two pairs of contradictory groups. At present, the problems are usually solved by changing segment gap of the spacers, but the effect is not ideal.

SUMMARY OF THE INVENTION

The present application provides a spacer, a method for manufacturing the spacer, and a display device to solve a problem that the space is unable to accommodate the needs of elastic recovery rate in all aspects in the existing technology, thereby affecting the display performance.

The present application provides a method for manufacturing a spacer, comprising following steps:
- a step S10 of reacting a resin compound and a pyridine compound to generate an intermediate;
- a step S20 of reacting the intermediate and a metal ligand by a coordination reaction to obtain a coordination structure; and
- a step S30 of mixing the coordination structure, a monomer, a solvent, a starting agent, and an additive to prepare the spacer.

In one embodiment of the present application, a general structural formula of the coordination structure is:

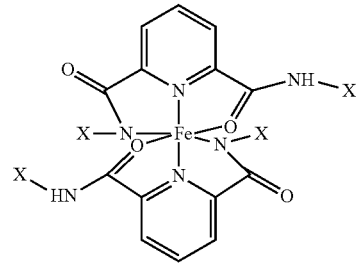

wherein X is a resin group.

In one embodiment of the present application, the resin compound comprises acrylic or

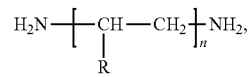

wherein R comprises —COOCH$_3$ or —COOH, the pyridine compound comprises

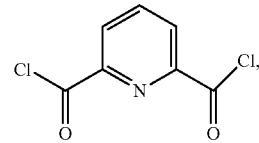 [SMILES: O=C(Cl)c1cccc(C(=O)Cl)n1]

and the metal ligand comprises ferric chloride.

In one embodiment of the present application, the step S30 further comprises mixing the coordination structure, the monomer, the solvent, the starting agent, and the additive to prepare a photoresist, and the photoresist is subjected to a yellow light process to obtain the spacer.

In one embodiment of the present application, a proportion of the coordination structure in material of the spacer is 15%, and the material of the spacer comprises the coordination structure, the monomer, the solvent, the starting agent, and the additive.

In one embodiment of the present application, a proportion of the monomer in the material of the spacer is 15%, a proportion of the solvent in the material of the spacer is 67%, a proportion of the starting agent in the material of the spacer is 2%, and a proportion of the additive in the material of the spacer is 1%.

In one embodiment of the present application, the monomer comprises acrylic resin, the solvent comprises propylene glycol methyl ether acetate or cyclohexanone, the starting agent comprises 2-methyl-1-(4-methyl sulfonium phenyl)-2-morpholine base-1-acetone, and the additive comprises a silane coupling agent or a dispersant.

In one embodiment of the present application, the proportions of the coordination structure, the monomer, the solvent, the starting agent, and the additive in the material of the spacer are mass proportions.

According to the above items in this application, a spacer is provided, a material of the spacer comprises the coordination structure, and a general structural formula of the coordination structure is:

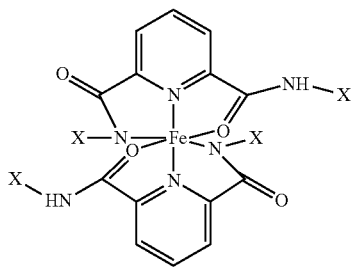

wherein X is a resin group.

In one embodiment of the present application, a proportion of the coordination structure in the material of the spacer is 15%, and the material of the spacer comprises the coordination structure, the monomer, the solvent, the starting agent, and the additive.

In one embodiment of the present application, a proportion of the monomer in the material of the spacer is 15%, a proportion of the solvent in the material of the spacer is 67%, a proportion of the starting agent in the material of the spacer is 2%, and a proportion of the additive in the material of the spacer is 1%.

In one embodiment of the present application, the monomer comprises acrylic resin, the solvent comprises propylene glycol methyl ether acetate or cyclohexanone, the starting agent comprises 2-methyl-1-(4-methyl sulfonium phenyl)-2-morpholine base-1-acetone, and the additive comprises a silane coupling agent or a dispersant.

In one embodiment of the present application, the proportions of the coordination structure, the monomer, the solvent, the starting agent, and the additive in the material of the spacer are mass proportions.

According to the above items in this application, a display device is provided, the display device comprises a first substrate and a second substrate disposed opposite to each other, a liquid crystal layer disposed between the first substrate and the second substrate, and a spacer, and the spacer is disposed in the liquid crystal layer, material of the spacer for preparing the spacer comprises a coordination structure, and a general structural formula of the coordination structure is:

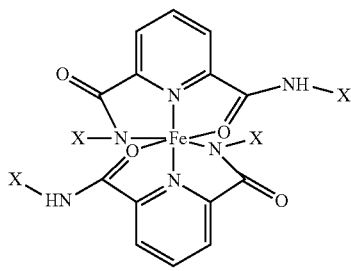

wherein X is a resin group.

In one embodiment of the present application, a proportion of the coordination structure in the material of the spacer is 15%, and the material of the spacer comprises the coordination structure, a monomer, a solvent, a starting agent, and an additive.

In one embodiment of the present application, a proportion of the monomer in the material of the spacer is 15%, a proportion of the solvent in the material of the spacer is 67%, a proportion of the starting agent in the material of the spacer is 2%, and a proportion of the additive in the material of the spacer is 1%.

In one embodiment of the present application, the monomer comprises acrylic resin, the solvent comprises propylene glycol methyl ether acetate or cyclohexanone, the starting agent comprises 2-methyl-1-(4-methyl sulfonium phenyl)-2-morpholine base-1-acetone, and the additive comprises a silane coupling agent or a dispersant.

In one embodiment of the present application, the proportions of the coordination structure, the monomer, the solvent, the starting agent, and the additive in the material of the spacer are mass proportions.

The benefit of the present application is: a self-repairing and scalable ligand coordination structure in the electric field is added into a spacer of the present application, so that the spacer can be self-repaired after being damaged and can change shape in different electric fields, hence accommodating the opposite needs of elastic recovery rate between the high temperature Mura and the high altitude low pressure and between the low temperature bubble and the surface pressure, thereby improving the display performance and the quality of products.

BRIEF DESCRIPTION OF THE SEVERAL VIEWS OF THE DRAWINGS

Through a detailed description of the specific implementation of the present application and below in conjunction with the drawings, technical solutions of the present application and other beneficial effects will be made obvious.

DESCRIPTION OF SPECIFIC EMBODIMENTS OF THE INVENTION

Figure 1:
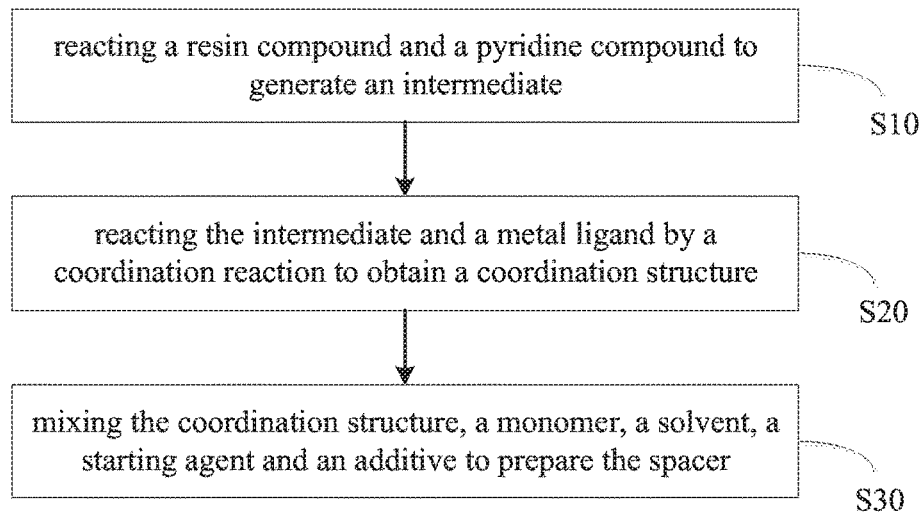
FIG. 1 is a flowchart of a method for manufacturing a spacer of one embodiment according to the present application.

The technical solutions in the embodiments of the present application will be clearly described below in conjunction with the drawings in the embodiments of the present application. It is clear that the described embodiments are only a part of the embodiments of the present application, but not all of the implementation Example. Based on the embodiments in this application, all other embodiments obtained by those skilled in the art without making creative work fall within the scope of protection of this application.

The following description of each embodiment refers to an additional illustration to illustrate specific embodiments that can be implemented in the present application. Directional terms mentioned in this application, such as "upper", "lower", "front", "back", "left", "right", "inner", "outer", "side", etc. are the direction of the schema. Therefore, the directional language used is to illustrate and understand this application, not to limit this application. In the figure, units with similar structures are indicated by the same reference numerals.

In the description of this application, it should be understood that the term "center", "longitudinal", "horizontal", "length", "width", "thickness", "upper", "down", "front", "back", "left", "right", "vertical", "horizontal", "top", "bottom", "inner", "outer", "clockwise", and "anticlockwise" indicates a location or position relations based on the location or position shown in the appended drawings, rather than instructions referred to in or implied devices or components must have a specific location, in a specific orientation structure and operation. Therefore, it cannot be interpreted as a restriction on this application. In addition, the terms "first" and "second" are used for purposes only and cannot be understood to indicate or imply relative importance or to imply the number of technical characteristics indicated. Thus, the characteristics that are defined as "first" or "second" may explicitly or implicitly include one or more of the characteristics. In the description of this application, "multiple" means two or more, unless specifically defined otherwise. In addition, the term "first", "second" is only used for descriptive purposes, and cannot be understood as indicating or implying relative importance or implicitly indicating the number of technical features indicated. Thus, the characteristics that are defined as "first" or "second" may explicitly or implicitly include one or more of the characteristics. In the description of this application, "multiple" means two or more, unless otherwise specifically limited.

In the description of this application, it should be noted that, unless otherwise expressly specified and limited, the terms "installed", "connected" and "connected" shall be understood in a broad sense, for example, as fixed, detachable or one-piece; it can be mechanical, it can be electrical or it can communicate with each other; it can be either directly connected or indirectly connected through an intermediary, or it can be a connection between two elements or an interaction between two elements. For the general technical personnel in this field, the specific meaning of the above terms in this application can be understood according to the specific situation.

In this application, unless otherwise expressly provided and limited, the first feature "above" or "below" the second feature may include direct contact with the first and second features or may include contact with the first and second features not directly but through other features between them. Moreover, the first feature "above", "above" and "above" of the second feature include the first feature directly above and obliquely above the second feature, or simply means that the level of the first feature is higher than that of the second feature. The first feature is "below", "below" and "below" of the second feature, including the first feature directly below and diagonally below the second feature, or simply means that the horizontal height of the first feature is less than that of the second feature.

The following disclosure provides many different implementations or examples for implementing different structures of the present application. In order to simplify the disclosure of the present application, the components and settings of specific examples are described below. Of course, they are merely examples, And the purpose is not to limit this application. In addition, this application may repeat reference numerals and/or reference letters in different examples, such repetition is for the purpose of simplicity and clarity, and does not itself indicate various embodiments and/or discussed relationship between settings. In addition, this application provides examples of various specific processes and materials, but those of ordinary skill in the art may be aware of the application of other processes and/or the use of other materials.

This application is aimed at existing spacers. As an elastic recovery rate cannot meet opposite requirements between high temperature Mura and high altitude low pressure as well as between low temperature bubble and surface pressure test, product yield and display effect will be affected.

In order to solve the above technical problems, this application embodiment provides a method for manufacturing a spacer. Please refer to FIG. 1. The method includes:
a step S10 of reacting a resin compound and a pyridine compound to generate an intermediate;
a step S20 of reacting the intermediate and a metal ligand by a coordination reaction to obtain a coordination structure; and
a step S30 of mixing the coordination structure, a monomer, a solvent, a starting agent, and an additive to prepare the spacer.

During an implementation process, an elastic recovery rate of the spacer of the liquid crystal display device has a higher requirement, wherein, high temperature Mura (uneven display), low temperature bubble (bubble), high altitude low pressure and a surface pressure test are technical problems commonly faced by the LCDs. A better Mura performance requires the spacer to have good elasticity, but a high low pressure requires the spacer to have less elasticity to allow it to be pressed down when shrinking, while a better surface pressure requires the spacer to resist pressure and not be pressed down when shrinking. Hence, the four performances are combined into two pairs of contradictory groups. The spacer of the prior art cannot solve the above problems. The present application provides a method for manufacturing a spacer, a self-repairing and scalable ligand coordination structure in the electric field is added into a spacer of the present application, so that the spacer can be self-repaired after being damaged and can change shape in different electric fields, hence accommodating the opposite needs of elastic recovery rate between the high temperature Mura and the high altitude low pressure and between the low temperature bubble and the surface pressure, thereby improving the display performance and the quality of products.

Furthermore, the following is a detailed description of the method for manufacturing the spacer, the spacer, and the display device.

The method includes:
S10: reacting a resin compound and a pyridine compound to generate an intermediate.
The resin compound includes acrylic or

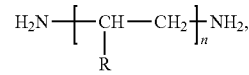

wherein R comprises —COOCH$_3$ or —COOH, the pyridine compound comprises

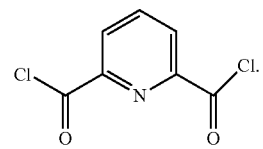 [SMILES: O=C(Cl)c1cccc(C(=O)Cl)n1]

Only the above materials are used for instructions, but they are not limited to this, wherein the R can be other ester groups, the resin compound can be described as a variety of resin polymer, the pyridine compounds can be described as 2,6-pyridinediformyl chloride, wherein the chlorine atom group may also be a bromine atom group, an amino group, or a hydroxyl group.

For example, the resin compound is

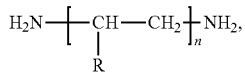

and the pyridine compound is

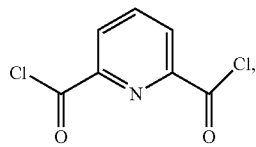 [SMILES: O=C(Cl)c1cccc(C(=O)Cl)n1]

so the resin compound reacts with the pyridine compound by a substitution reaction, and a reaction process is as follows:

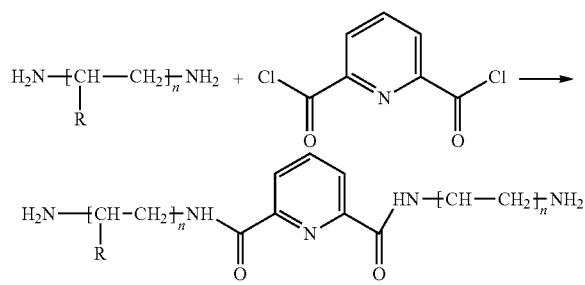

and the intermediate

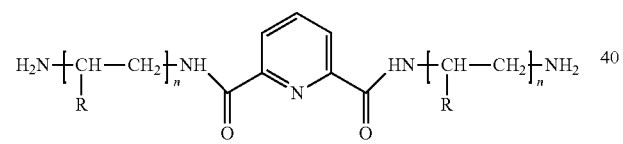

is obtained.

S20: reacting the intermediate and a metal ligand by a coordination reaction to obtain a coordination structure.

The metal ligand comprises ferric chloride, and a reaction process of the intermediate and the ferric chloride is as follows:

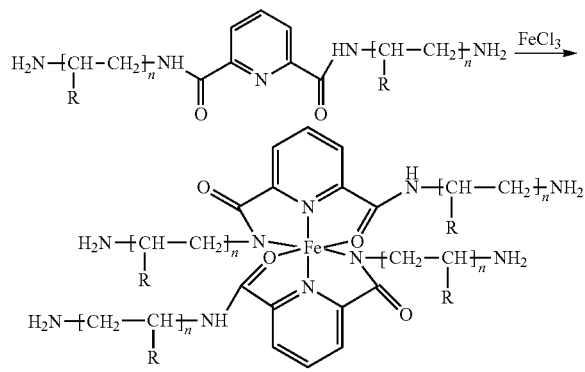

The coordination structure

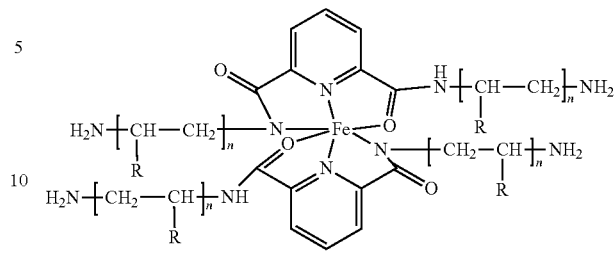

is obtained, and a formula of the coordination structure can be

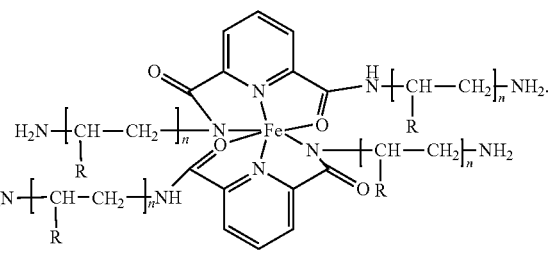

Specially, because the resin compound and the pyridine compound can be a combination of multiple structures, a general structural formula of the coordination structure can be:

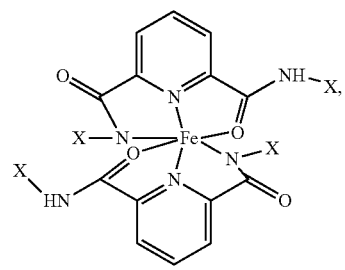

wherein X is a resin group.

The following explanation is only an example

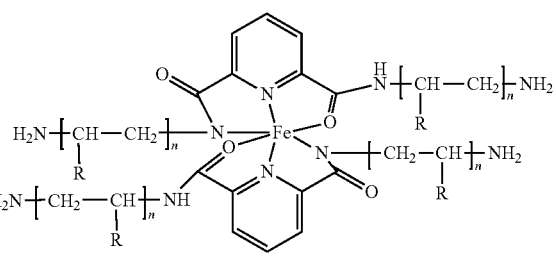

for illustration.

The coordination structure has a self-repairing function and can stretch out and draw back in the electric field, so that it can be self-repaired after being damaged and changes shape in different electric field.

S30: mixing the coordination structure, a monomer, a solvent, a starting agent, and an additive to prepare the spacer.

The step S30 further includes: mixing the coordination structure, the monomer, the solvent, the starting agent, and the additive to prepare a photoresist under a certain temperature and pressure, the photoresist is subjected to a yellow light process to obtain the spacer. The yellow light process includes regular exposure, development, and etching, etc.

Furthermore, a proportion of the coordination structure in material of the spacer is 15%, and the material of the spacer comprises the coordination structure, the monomer, the solvent, the starting agent, and the additive.

In addition, a proportion of the monomer in the material of the spacer is 15%, a proportion of the solvent in the material of the spacer is 67%, a proportion of the starting agent in the material of the spacer is 2%, and a proportion of the additive in the material of the spacer is 1%.

In embodiments of the present application, the monomer comprises acrylic resin, the solvent comprises propylene glycol methyl ether acetate or cyclohexanone, the starting agent comprises 2-methyl-1-(4-methyl sulfonium phenyl)-2-morpholine base-1-acetone, such as I907, and the starting agent also can be I903 of normal starting agents, and the additive comprises a silane coupling agent or a dispersant.

It should be noted that, the proportions of the coordination structure, the monomer, the solvent, the starting agent, and the additive of the material of the spacer are mass proportions.

The present application also provides a spacer, the spacer is prepared by the above method for manufacturing the spacer, and the manufacturing process is not further described herein. The spacer includes the coordination structure

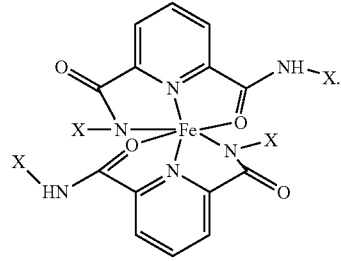

Figure 2:
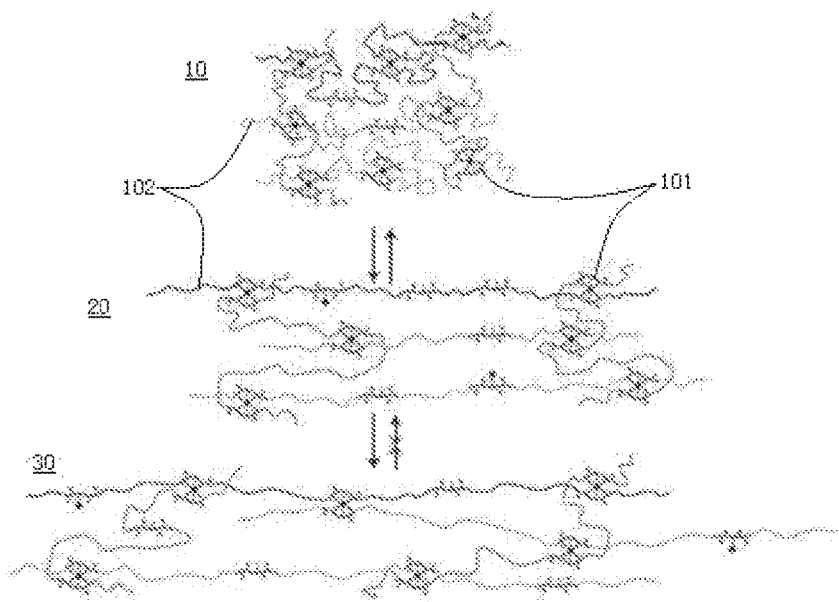
FIG. 2 is an expansion schematic diagram of a coordination structure of one embodiment according to the present application.

Referring to FIG. 2, FIG. 2 is an expansion schematic diagram of the coordination structure. The coordination structure includes a metal complex core 101, and a resin group 102 connected with the metal complex core 101. The stretch out and draw back state includes a first state 10, a second state 20, and a third state 30. It should be noted that, a stretch out and draw back conversion can be proceeded between the first state 10 and the second state 20, after the second state 20 is stretched out to the third state 30, an elastic limit of the coordination structure is exceeded, and it is unable to revert to the second state 20.

Specially, because the coordination structure has coordination bonds, and the coordination bond has physical (thermal) reversibility or chemical reversibility, it can be used to build a repair material. At the same time, because of the coordination bond has a moderate strength, it is able to overcome the shortcoming of an interaction between reversible covalent bond and non-covalent bond. Therefore, the spacer containing the coordination structure has excellent mechanical properties, can be stretched from 1 inch (about 2.5 cm) to 100 inches (about 2.5 meters), and because of the existence of metal coordination bond, the spacer can be self-repaired under the condition of minus 20 degrees Celsius, and can even repair itself after being crushed, thereby solving the surface pressure problem. The spacer can also be controlled by the electric field to stretch out and draw back, voltage is applied to make the spacer stretch out, and voltage is removed to make it draw back. Under the action of the electric field, the spacer can be changed by 0.5-1.5 times its own volume, so as to meet the requirements of elastic recovery rate that cannot be met by the existing display device.

A formula of the metal complex core 101 can be

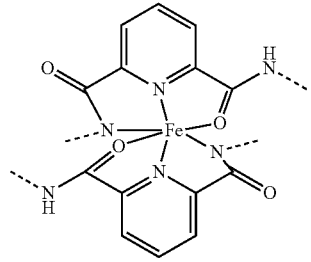

Figure 3:
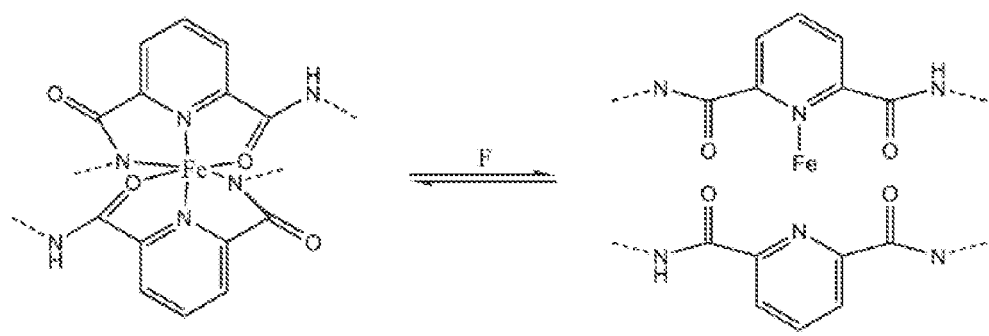
FIG. 3 is a schematic diagram of an expansion structure of a metal complex core of one embodiment according to the present application.

Referring to FIG. 3, FIG. 3 is a schematic diagram of an expansion structure of a metal complex core 101 in force. By action of the force F, weak bond rupture of the metal complex core 101 occurs, and only strong bond will not be destroyed. But when the force F is removed, the strong bond can pull weak bond back to the original state, thus allowing the coordination structure to have excellent mechanical properties and improving the mechanical properties of the spacer.

In summary, the present application provides a spacer and a method for manufacturing the spacer. A coordination structure is added into the spacer to allow the spacer to have excellent mechanical properties and improve the self-repairing function of the spacer, thus meeting the requirements of elastic recovery rate that cannot be met by the existing display device, and improving the display performance and the quality of the products.

Figure 4:
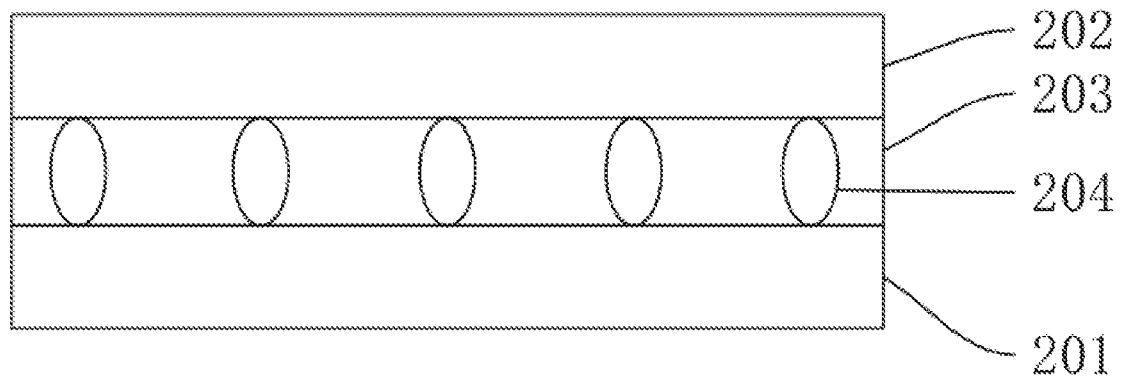
FIG. 4 is a structural diagram of a display device of one embodiment according to the present application.

In addition, the present application provides a display device. Referring to FIG. 4, the display device includes a first substrate 201 and a second substrate 202 disposed opposite to each other, a liquid crystal layer 203 disposed between the first substrate 201 and the second substrate 202, and a spacer 204 disposed in the liquid crystal layer 203. The spacer 204 is described as the spacer of the above embodiment, and its structure and manufacturing method are the same, which will not be repeated here.

It should be noted that, the first substrate 201 and the second substrate 202 of the above only shows an array substrate and a color film substrate. These structural layers are only a brief description of the partial structures and components of the display device, but are not limited to this: for example, the color film substrate contains a black matrix (BM), RGB color resist layers, etc., the array substrate contains thin film transistor (TFT) switches, scanning lines, data lines, pixel electrodes, common electrodes, etc., and the display device also includes various other display components, such as an alignment film and a frame glue, etc., between the array substrate and the color film substrate. These details can be implemented with reference to the existing technology, and will not be repeated here.

In summary, the present application provides a spacer and a method for manufacturing the spacer. A self-repairing and scalable ligand coordination structure in the electric field is added into a spacer of the display device, so that the spacer can be self-repaired after being damaged and can change shape in different electric fields, hence accommodating the opposite needs of elastic recovery rate between the high temperature Mura and the high altitude low pressure and between the low temperature bubble and the surface pressure, thereby achieving excellent mechanical properties, improving self-repairing capability, improving the display performance, and improving the quality of products.

In the above embodiments, the description of each embodiment has its own focus, a part of an embodiment that is not detailed, you can refer to the relevant description of other embodiments.

The above describes a spacer, a method for manufacturing the spacer, and a display device provided by the embodiments of the present application in detail. In this article, specific examples are used to explain the principles and implementation of the present application. To help understand the technical solutions and core ideas of this application; those of ordinary skill in the art should understand: they can still modify the technical solutions described in the foregoing embodiments, or equivalently replace some of the technical features; and these modification or replacement does not make the essence of the corresponding technical solutions deviate from the scope of the technical solutions of the embodiments of the present application.

What is claimed is:

1. A method for manufacturing a spacer, comprising the following steps:

a step S10 of reacting a resin compound and a pyridine compound to generate an intermediate;

a step S20 of reacting the intermediate and a metal salt by a coordination reaction to obtain a coordination structure; and a step S30 of mixing the coordination structure, an acrylic resin, a solvent, a starting agent, and an additive to prepare the spacer, wherein the resin compound comprises acrylic or

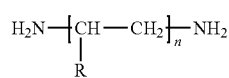

R comprises —COOCH$_3$ or —COOH, the pyridine compound comprises

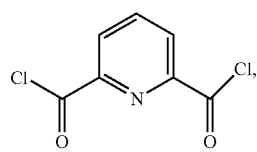 [SMILES: O=C(Cl)c1cccc(C(=O)Cl)n1]

and the metal salt comprises ferric chloride.

2. The method for manufacturing the spacer of claim 1, wherein a general structural formula of the coordination structure is:

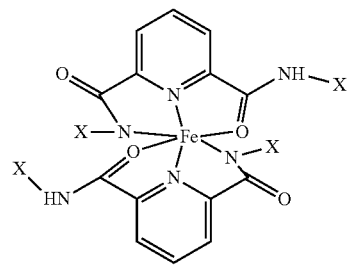

wherein X is

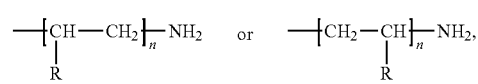

and R comprises —COOCH$_3$ or —COOH.

3. The method for manufacturing the spacer of claim 1, wherein the step S30 further comprises mixing the coordination structure, the acrylic resin, the solvent, the starting agent, and the additive, followed by exposure, development, and etching to obtain the spacer.

4. The method for manufacturing the spacer of claim 1, wherein a proportion of the coordination structure in material of the spacer is 15 wt %, and the material of the spacer comprises the coordination structure, the acrylic resin, the solvent, the starting agent, and the additive.

5. The method for manufacturing the spacer of claim 4, wherein a proportion of the acrylic resin in the material of the spacer is 15 wt %, a proportion of the solvent in the material of the spacer is 67 wt %, a proportion of the starting agent in the material of the spacer is 2 wt %, and a proportion of the additive in the material of the spacer is 1 wt %.

6. The method for manufacturing the spacer of claim 5, wherein the solvent comprises propylene glycol methyl ether acetate or cyclohexanone, the starting agent comprises 2-methyl-1-(4-methyl sulfonium phenyl)-2-morpholine base-1-acetone, and the additive comprises a silane coupling agent or a dispersant.

7. A spacer manufactured by a method comprising the following steps:

a step S10 of reacting a resin compound and a pyridine compound to generate an intermediate;

a step S20 of reacting the intermediate and a metal salt by a coordination reaction to obtain a coordination structure; and a step S30 of mixing the coordination structure, an acrylic resin, a solvent, a starting agent, and an additive to prepare the spacer, wherein the resin compound comprises acrylic or

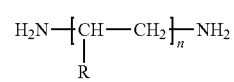

R comprises —COOCH$_3$ or —COOH, the pyridine compound comprises

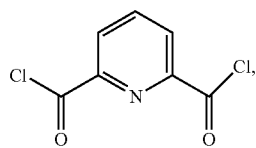 [SMILES: O=C(Cl)c1cccc(C(=O)Cl)n1]

and the metal salt comprises ferric chloride, and wherein a material of the spacer comprises the coordination structure, and a general structural formula of the coordination structure is:

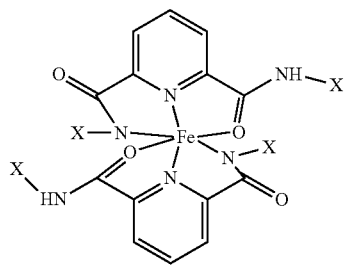

wherein X is

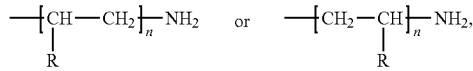

and R comprises —COOCH$_3$ or —COOH.

8. The spacer of claim 7, wherein a proportion of the coordination structure in the material of the spacer is 15 wt %, and the material of the spacer comprises the coordination structure, the acrylic resin, the solvent, the starting agent, and the additive.

9. The spacer of claim 8, wherein a proportion of the acrylic resin in the material of the spacer is 15 wt %, a proportion of the solvent in the material of the spacer is 67 wt %, a proportion of the starting agent in the material of the spacer is 2 wt %, and a proportion of the additive in the material of the spacer is 1 wt %.

10. The spacer of claim 9, wherein the solvent comprises propylene glycol methyl ether acetate or cyclohexanone, the starting agent comprises 2-methyl-1-(4-methyl sulfonium phenyl)-2-morpholine base-1-acetone, and the additive comprises a silane coupling agent or a dispersant.

11. A display device, wherein the display device comprises a first substrate and a second substrate disposed opposite to each other, a liquid crystal layer disposed between the first substrate and the second substrate, and a spacer, and the spacer is disposed in the liquid crystal layer, material of the spacer for preparing the spacer comprises a coordination structure, and a general structural formula of the coordination structure is:

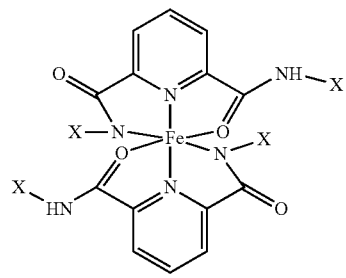

wherein X is

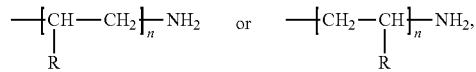

and R comprises —COOCH$_3$ or —COOH.

12. The display device of claim 11, wherein a proportion of the coordination structure in the material of the spacer is 15 wt %, and the material of the spacer comprises the coordination structure, an acrylic resin, a solvent, a starting agent, and an additive.

13. The display device of claim 12, wherein a proportion of the acrylic resin in the material of the spacer is 15 wt %, a proportion of the solvent in the material of the spacer is 67 wt %, a proportion of the starting agent in the material of the spacer is 2 wt %, and a proportion of the additive in the material of the spacer is 1 wt %.

14. The display device of claim 13, wherein the solvent comprises propylene glycol methyl ether acetate or cyclohexanone, the starting agent comprises 2-methyl-1-(4-methyl sulfonium phenyl)-2-morpholine base-1-acetone, and the additive comprises a silane coupling agent or a dispersant.

* * * * *